United States Patent [19]

Neeff

[11] Patent Number: 4,584,864
[45] Date of Patent: Apr. 29, 1986

[54] METHOD AND APPARATUS FOR PROVING AND FACTORING A METER STACK

[76] Inventor: Harry B. Neeff, 1530 "C" St., Casper, Wyo. 82602

[21] Appl. No.: 611,847

[22] Filed: May 18, 1984

[51] Int. Cl.⁴ .......................................... G01F 25/00
[52] U.S. Cl. .................................................. 73/3
[58] Field of Search .................. 73/3, 861.77, 861.01; 235/94 R, 94 A; 377/21

[56] References Cited

U.S. PATENT DOCUMENTS

| | | | |
|---|---|---|---|
| 2,851,882 | 9/1958 | Nottingham | 73/195 |
| 2,959,058 | 11/1960 | Berck | 73/861.01 |
| 3,035,434 | 5/1962 | St. Clair | 73/3 |
| 3,083,570 | 4/1963 | Truman | 73/195 |
| 3,171,952 | 3/1965 | Brown | 235/92 |
| 3,254,523 | 6/1966 | Fisher | 73/3 |
| 3,469,078 | 9/1969 | Binford | 377/21 |
| 3,641,806 | 2/1972 | Bruening | 73/3 |
| 3,816,714 | 6/1974 | Reed | 235/94 R |
| 4,012,623 | 3/1977 | Fleischer | 235/92 FL |
| 4,132,887 | 1/1979 | Fleischer | 235/92 FL |

FOREIGN PATENT DOCUMENTS 2023542 1/1980 United Kingdom ................ 377/21

*Primary Examiner*—Jerry W. Myracle
*Attorney, Agent, or Firm*—W. Scott Carson

[57] ABSTRACT

A method and apparatus for proving and factoring a meter stack on a flow pipe. The meter stack preferably includes a meter, temperature compensator, and counter and in accordance with the present invention, the meter is positioned within the flow pipe for rotation about a first axis in response to fluid flow through the pipe. The temperature compensator is then driven by the rotating member through a first plurality of gears and the compensator in turn drives the counter through a second plurality of gears. Downstream of the counter gears is a final counter shaft which is mounted for rotation about a second axis and which drives the number wheels of a digital read out. In the preferred embodiment of the invention, a right angle drive is taken off the final counter shaft and the amount of angular rotation of the shaft is measured with a high resolution pulser while a known volume of liquid flows through the meter. The high resolution pulser measures on the order of the magnitude of at least 100 and preferably 1000 times smaller than the smallest incremental read out of the number wheels. By then comparing the measured amount of angular rotation of the counter shaft against a predetermined amount representing a true reading of the known volume, the meter stack from the meter through the counter shaft can be proven; and, when necessary, an adjustment factor for the entire meter stack can be determined.

18 Claims, 5 Drawing Figures

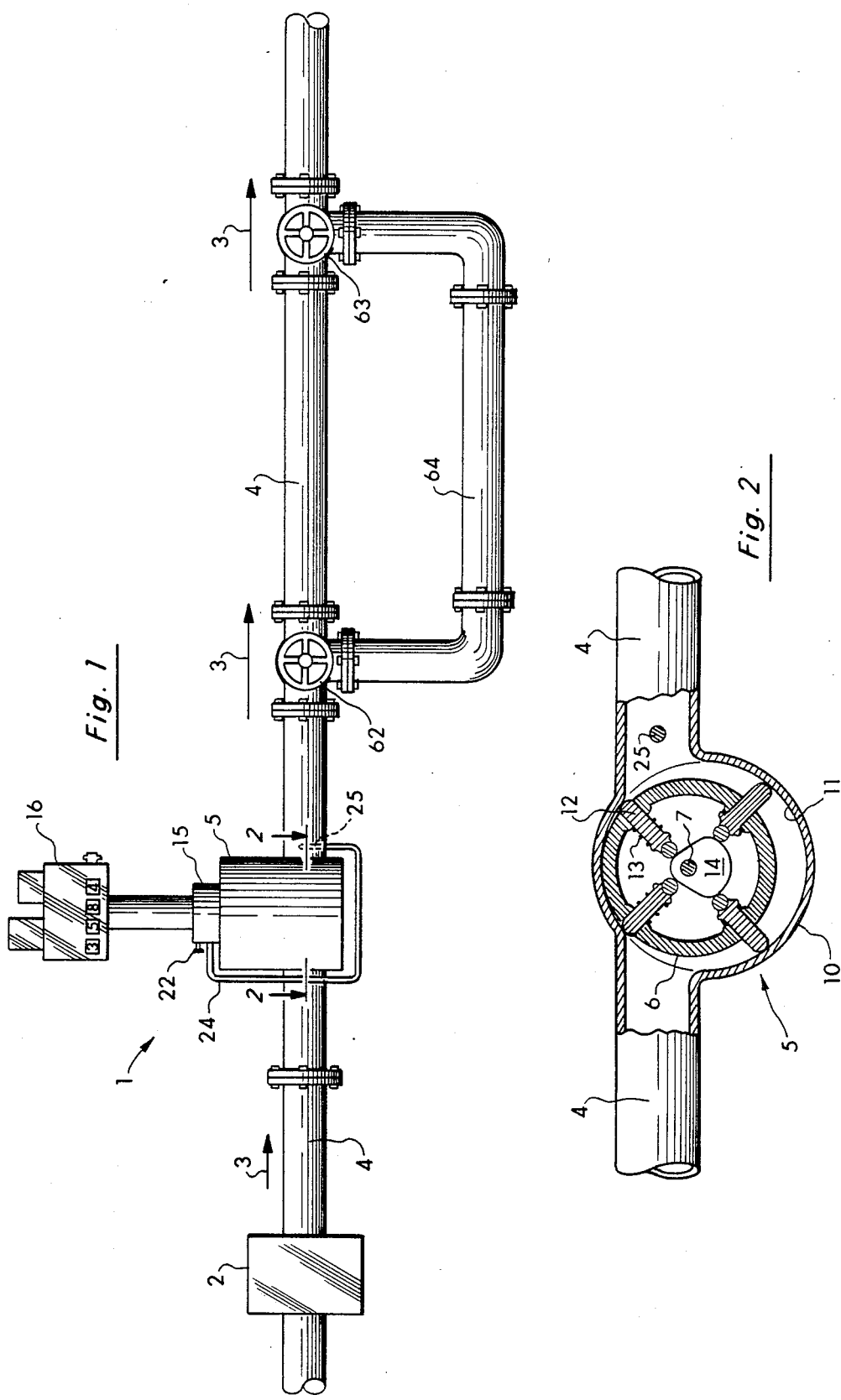

METHOD AND APPARATUS FOR PROVING AND FACTORING A METER STACK

FIELD OF THE INVENTION

This invention relates primarily to the field of proving and factoring meters on oil pipes.

BACKGROUND OF THE INVENTION AND PRIOR ART

Meters are extensively used in the oil and gas industry to monitor and record product transfer, particularly by pipe. Such meters must be highly accurate as their readings often form the sole basis for determining the cost of goods sold and related matters such as royalties to be paid to interested parties (e.g., state and federal agencies, land owners, and investment partners). Consequently, periodic proving of the meters for accuracy is of paramount importance.

In the past, the typical procedure for proving a meter was to place a right angle drive in the meter stack between the meter and the counter (or in a more common stack of a meter, temperature compensator, and counter, between the temperature compensator and the counter). Off the right angle drive is then placed a high resolution pulser that provides the exact number of pulses per barrel passed through the meter. These pulses are then compared to the prover volume to arrive at a correction factor. This is done by comparing the actual flow through the prover volume with the reading of the pulser.

The fundamental problem overlooked by the entire industry with such methods is the location in the meter stack of the read by the right angle drive. More specifically, because the right angle drive is driven from below, the pulser reading is actually only giving a factor applicable from the right angle drive down to the meter. In other words, in determining the meter factor, the industry has assumed that all of the gear trains above the right angle take off including in the counter itself are correct and in proper working order. However, past experience has shown in particular that the counter does not always agree with the meter as when, for example, the counter gearing is wrong or has been changed out and improper gears installed or there is gear or coupling slippage due to poor connections or sheared pins. Additionally, this fundamental problem overlooked by the industry cannot simply be solved by comparing the normal counter read out with the pulser count taken below the counter because the industry itself demands more accuracy than the digit read out of the counter is capable. For example, counter read outs are typically displayed to tenths of a barrel which is commercially acceptable; however, typical pulser counts to arrive at a factor are required to be on the order of 5,000–10,000 pulses per barrel with a accuracy on the order of 3/10,000 of a barrel. Such required accuracy is literally on the order of drops of oil. Consequently, it is not enough to simply compare the digital read out of the counter with the pulses of the high resolution pulser.

With the above problems in mind, the method and apparatus of the present invention were developed. In accordance with the present invention, the final counter shaft of the counter off of which the number wheels of the counter are driven is used to prove and factor the meter stack. In this manner, the meter stack is proven and factored all the way from the meter up through the final counter shaft itself. Further, a single factor for the entire meter stack is then determined and if the factor is other than a perfect 1, it is immaterial and unnecessary to determine where in the multiple drive means and gearing of the entire stack the problem may be. Rather, the factor for the entire stack can merely be used to accurately correct any imperfection in the components of the stack from the meter up through the final counter shaft.

SUMMARY OF THE INVENTION

This invention involves a method and apparatus for proving and factoring a meter stack on a flow pipe. The meter stack preferably includes a meter, temperature compensator, and counter. In accordance with the present invention, the meter is positioned within the flow pipe for rotation about a first axis in response to fluid flow through the pipe. The temperature compensator is then driven by the rotating meter through a first plurality of gears and the temperature compensator in turn drives the counter through a second plurality of gears. Downstream of the counter gears is a final counter shaft which is mounted for rotation about a second axis and which drives the number wheels of a digital read out means. In accordance with the preferred embodiment of the invention, a right angle drive is taken off the final counter shaft and the amount of angular rotation of the shaft is measured with a high resolution pulser while a known volume of liquid flows through the meter. The high resolution pulser measures on the order of the magnitude of at least 100 and preferably 1000 times smaller than the smallest incremental read out of the number wheels. Then, by comparing the measured amount of angular rotation of the counter shaft against a predetermined amount representing a true reading of the known volume, the meter stack from the meter through the counter shaft can be proven; and, when necessary, an adjustment factor for the entire meter stack can be determined to compensate for any inaccuracies in the drive couplings from the meter all the way up through the final counter shaft. In another embodiment, the shaft driven by the right angle drive off the final counter shaft is adapted to include an eccentric cam and follower to operate a low resolution pulser wherein the high and low resolution pulsers are driven off of a common shaft.

BRIEF DESCRIPTION OF THE DRAWINGS

FIG. 1 illustrates a simplified flow pipe arrangement with a meter stack adapted to incorporate the present invention.

FIG. 2 is a cross-sectional view of the meter taken along line 2—2 of FIG. 1.

DETAILED DESCRIPTION OF THE PREFERRED EMBODIMENTS

Figure 3:
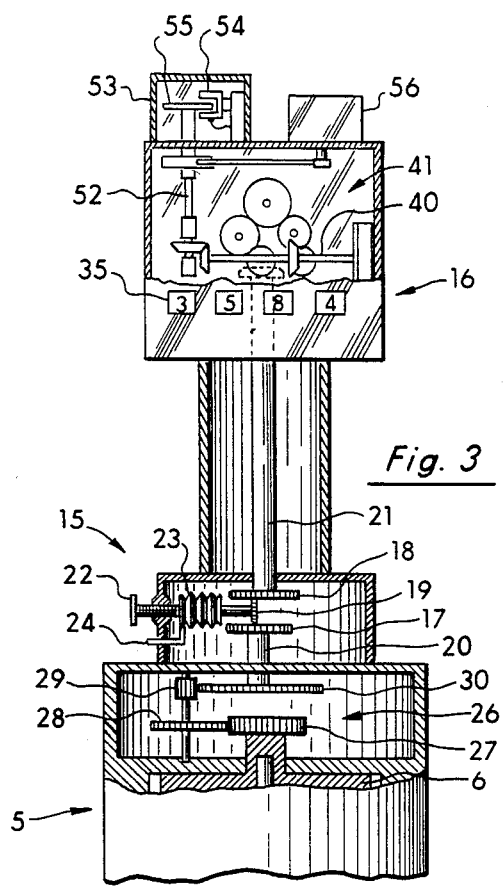
FIG. 3 is a partial, cross-sectional view of the meter stack of the present invention including the meter, temperature compensator, and counter.

FIG. 1 illustrates a simplified flow pipe arrangement and meter stack 1 adapted to incorporate the present invention. In this arrangement, oil or other fluid is normally pumped by pump 2 in the direction of arrows 3 through the pipe 4. The pipe 4 is metered at 5 and in normal operation, the metering element 6 (see FIG. 2) within the meter 5 is rotated about axis 7 by the flow. Meter 5 is shown as a positive displacement meter for illustrative purposes but can be of any conventional design desired. As shown, meter 5 in FIG. 2 has a cylindrical casing 10 with a cylindrical inner wall 11 within which the metering element 6 is mounted for rotation about the axis 7. The metering element 6 includes vanes 12 mounted at intervals about the axis 7. The vanes 12 are spring biased inwardly by springs 13 and operated by stationary cam 14 as the metering element 6 is rotated by the flow about axis 7.

Referring again to FIG. 1, the meter stack 1 preferably includes meter 5, a temperature compensator 15, and counter 16. Such stacks can and often do include a number of additional components and accessories; however, for the sake of simplicity, the stack 1 is shown with just these three basic elements which are more often than not present in all such stacks. The temperature compensator 15 can be of any conventional design and for the sake of clarity, is shown in FIG. 3 as a simple disc to disc (17 to 18) transfer through wheel 19. In a known manner, the radial position of wheel 19 relative to the offset rotational axes of shafts 20 and 21 causes the driven shaft 21 to be rotated faster or slower for any given angular velocity of the driving shaft 20. The radial position of the wheel 19 is then controlled by operation of the set screw 22 and bellows 23. By line 24 and bulb 25 in the flow pipe 4 (see FIGS. 1 and 2), the bellows 23 will be respectively expanded or contracted as the temperature of the fluid in the pipe 4 as measured by the bulb 25 increases or decreases. In operation, rotation of the metering element 6 as shown in FIG. 3 causes rotation of driving shaft 20 of the temperature compensator 15 through a first drive means 26 which includes a plurality of gears 27-30. Depending upon the radial position of wheel 19, driven shaft 21 of the temperature compensator 15 is then rotated at a temperature compensated rate relative to shaft 20. If desired, the compensator at 15 can simply be a manual one (e.g., just set screw 22) for making adjustments in measuring gross such as when a tank truck is being filled rather than the preferred temperature compensator shown which is used in measuring net.

Figure 4:
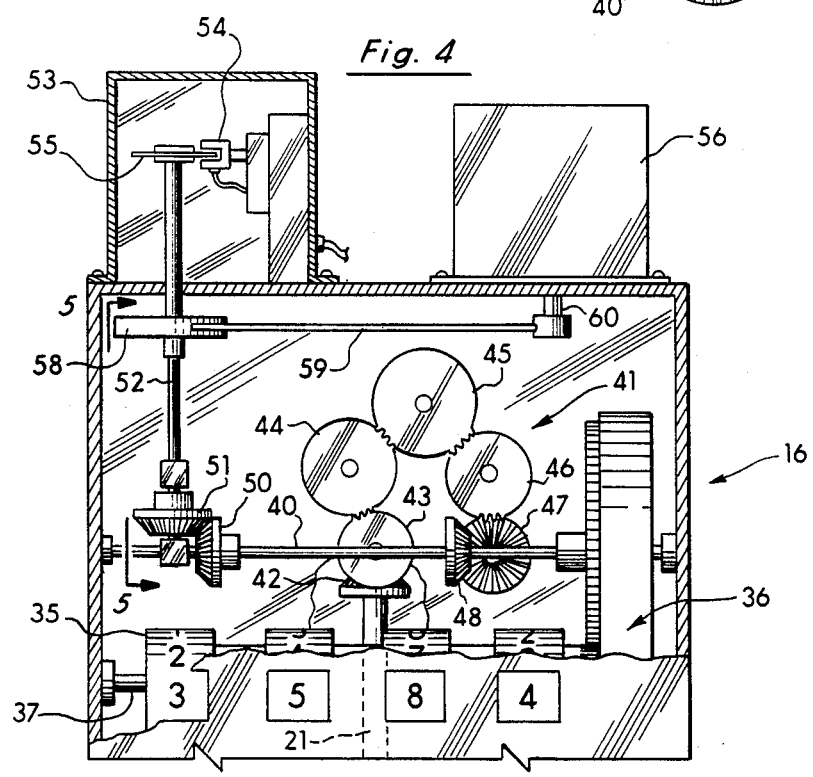
FIG. 4 is a partial, cross-sectional view of the counter of the meter stack as adapted to incorporate the present invention.

The counter 16 above the compensator 15 can be of any conventional design wherein the number wheels 35 (see FIG. 4) of the digital read out means 36 are run directly off of the final counter shaft 40. As seen in FIGS. 3 and 4, driven shaft 21 from the temperature compensator 15 drives the final counter shaft 40 through a second drive means 41. As in the case of drive means 26, drive means 41 consists of a plurality of counter and bevel gears including 42-48 (see FIG. 4). The final counter shaft 40 of the counter 16 is downstream of all of the counter gears including 42-48 of the counter 16 and, in fact, downstream of all of the drive means and gearing of the entire stack 1 from the rotating, metering element 6 through the gears of the counter 16. Final counter shaft 40 is preferably geared to make one revolution for each barrel passing through the metering element 6 and is the last rotating shaft before the digital read out means 36 whose number wheels 35 are rotatably mounted on a stationary shaft 37 and are sequentially operated in a known manner by transfer pinions or other conventional camming or gearing action from wheel to wheel (i.e., right to left in FIG. 4).

Figure 5:
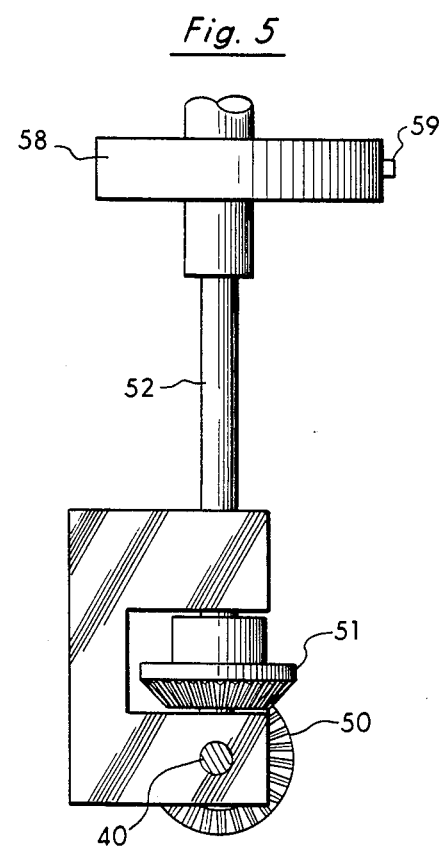
FIG. 5 is a view taken along line 5—5 of FIG. 4 illustrating the right angle drive off of the final counter shaft. This driven shaft is connected to a high resolution pulser and additionally includes an eccentric cam and follower arrangement which operate a low resolution counter.

In operation and in accordance with the method and apparatus of the present invention, the final counter shaft 40 is used for the first time as a reference point to prove and factor the meter stack 1 from the metering element 6 through the compensator 15 and counter 16 up to the number wheels 35 of the digital read out means 36. In this manner, a single factor for the entire meter stack is determined and if the factor is other than a perfect 1, it is immaterial and unnecessary to determine where in the multiple drive means and gearing of the entire stack the problem may be. Rather, the factor for the entire stack 1 can merely be used to accurately correct any imperfection in the components of the stack 1 from the metering element 6 through the final counter shaft 40. To accomplish this invention, a right angle drive (see FIGS. 4 and 5) through like bevelled gears 50 and 51 is taken off the final counter shaft 40 to drive shaft 52 preferably in a one to one relationship. Drive shaft 52 in turn operates the high resolution pulser 53 which can read on the order of 5,000-10,000 or more pulses per barrel. The operation of such a high resolution pulser 53 is known and conventional (see for example U.S. Pat. No. 3,254,523 to Fisher) and typically uses a light sensitive transistor 54 and interrupter disc 55. Additionally, shaft 52 in the present invention is used to drive a low resolution pulser 56 by the eccentric cam 58 and follower 59 arrangement on the shaft 52 as shown in FIGS. 4 and 5. The low resolution pulser 56 is preferably a simple micro-switch 60 operated with each revolution of shaft 52 and is essentially used as a monitor of the meter stack operation for gross periodic sampling and as a safety check that the meter stack 1 through the final counter shaft 40 is operating at all.

Referring again to FIG. 1, the method and apparatus of the present invention are used to prove and factor the meter stack 1 in the following manner. First, flow through pipe 4 is diverted at values 62 and 63 through the volumetric prover 64. In any number of conventional manners (see for example U.S. Pat. No. 3,254,523 to Fisher), a known volume of fluid is allowed to pass through the prover 64 and at the same time, the angular rotation of the final counter shaft 40 is measured by the high resolution pulser 53. The high resolution pulser 53 measures at least on an order of magnitude of 100 and preferably 1000 times smaller than the smallest incremental read out (e.g., tenths of a barrel) of the number wheels 35. If the prover 64 is intended to cause 10,000 pulses on the high resolution pulser 53 and 10,989 are registered, then the meter stack 1 must be factored by 10,000/10,989 or 0.91. With the present invention, an accuracy on the order of 3/10,000 of a barrel which is literally on the order of drops of oil is possible for the entire meter stack 1.

While several embodiments of the present invention have been described in detail herein, it is to be understood that various changes and modifications can be made to them without departing from the scope of the invention.

I claim:

1. A method for proving and factoring a meter stack on a flow pipe, said stack including a meter with a metering element positioned within said flow pipe for rotation about a first axis in response to fluid flow through said flow pipe, a compensator, and a counter; said compensator being operably coupled to said metering element through a first drive means including a first plurality of gears; said counter having in series a second plurality of gears, a final counter shaft mounted for rotation about a second axis, and a digital read out means run off of said final counter shaft; and, said final counter shaft being operably coupled to said compensator through a second drive means including said second plurality of gears of said counter, said method including the steps of:

(a) causing said metering element to rotate about said first axis by flowing a known volume of fluid through said meter, said metering element rotation causing operation of said compensator through said first drive means including said first plurality of gears, said compensator in turn causing rotation about said second axis of said final counter shaft through said second drive means including said second plurality of gears, and said final counter shaft in turn causing operation of said digital read out means, and (b) measuring the amount of angular rotation of said final counter shaft about said second axis while said known volume of fluid flows through said meter, said measuring being on an order of magnitude of at least 100 times smaller than the smallest incremental read out of the digital read out means wherein by comparing the measured amount of angular rotation of said final counter shaft against a predetermined amount representing a true reading of the known volume, the meter stack from the meter through the final counter shaft can be proven and an adjustment factor for the meter stack determined to compensate for any inaccuracies in the drive couplings from the meter through the final counter shaft.

2. The method of claim 1 wherein the measuring of step (b) is on an order of magnitude of 1000 times smaller than the smallest incremental read out of the digital read out means.

3. The method of claim 1 wherein said digital read out means has a plurality of number wheels rotatably mounted on a stationary shaft and sequentially rotated from wheel to wheel from the first to the last wheel with said first wheel being run off of said final counter shaft.

4. The method of claim 1 further including the step of gearing said final counter shaft to make one revolution about the second axis for each barrel of fluid passing through the metering element.

5. The method of claim 1 wherein the measuring of step (b) is accomplished using a high resolution pulser driven by a shaft and said shaft is driven off of the final counter shaft.

6. The method of claim 5 wherein the shaft driving said high resolution pulser is driven about an axis at a right angle to said second axis in a one to one relationship to said final counter shaft.

7. The method of claim 1 whereas said compensator is a temperature compensator.

8. A method for proving and factoring a meter stack on a flow pipe, said stack including a meter with a metering element positioned within said flow pipe for rotation about a first axis in response to fluid flow through said flow pipe, a compensator, and a counter, said compensator being operably coupled to said metering element through a first drive means including a first plurality of gears, said counter having in series a second plurality of gears, a final counter shaft mounted for rotation about a second axis, and a digital read out means run off of said final counter shaft, and, said final counter shaft being operably coupled to said compensator through a second drive means including said second plurality of gears of said counter, said method including the steps of:

(a) causing said metering element to rotate about said first axis by flowing a known volume of fluid through said meter, said metering element rotation causing operation of said compensator through said first drive means including said first plurality of gears, said compensator in turn causing rotation about said second axis of said final counter shaft through said second drive means including said second plurality of gears, and said final counter shaft in turn causing operation of said digital read out means, (b) measuring the amount of angular rotation of said final counter shaft about said second axis while said known volume of fluid flows through said meter, said measuring being accomplished by using a high resolution pulser driven by a shaft with said shaft being driven off of the final counter shaft, said measuring being on an order of magnitude of at least 100 times smaller than the smallest incremental read out of the digital read out means wherein by comparing the measured amount of angular rotation of said final counter shaft against a predetermined amount representing a true reading of the known volume, the meter stack from the meter through the final counter shaft can be proven and an adjustment factor for the meter stack determined to compensate for any inaccuracies in the drive couplings from the meter through the final counter shaft, and (c) measuring angular rotation of said final counter shaft with a low resolution pulser, said low resolution pulser being driven by a cam and cam follower arrangement with said cam eccentrically mounted on a shaft driven off of the final counter shaft.

9. The method of claim 8 wherein the shaft driving the high resolution pulser and the shaft driving the low resolution pulser are the same shaft.

10. Apparatus for proving and factoring a meter stack on a flow pipe, said stack comprising at least a meter with a metering element, compensator, and counter, said apparatus further including:

means for positioning said metering element within said flow pipe for rotation about a first axis in response to fluid flow through said flow pipe, first drive means for operably coupling said compensator to said metering element through a first plurality of gears, said counter having in series a second plurality of gears, a final counter shaft mounted for rotation about a second axis, and a digital read out means run off of said final counter shaft, second drive means for operably coupling said counter shaft to said compensator through said second plurality of gears, means for pumping a known volume of fluid through said meter, said metering element rotating about said first axis in response thereto and operating said compensator through said first drive means including said first plurality of gears, said compensator in turn operating said second drive means including said second plurality of gears to cause said final counter shaft to rotate about said second axis, and said final counter shaft in turn operating said digital read out means, and means for measuring the amount of angular rotation of said final counter shaft about said second axis while said known volume of fluid flows through said meter, said measuring means being on an order of magnitude of at least 100 times smaller than the smallest incremental read out of the digital read out means wherein by comparing the measured amount of angular rotation of said final counter shaft against a predetermined amount representing a true reading of the known volume, the meter stack from the meter through the final counter shaft can be proven and an adjustment factor for the meter stack determined to compensate for any inaccuracies in the drive couplings from the meter through the final counter shaft.

11. The apparatus of claim 10 wherein said measuring means is on an order of magnitude of 1000 times smaller than the smallest incremental read out of the digital read out means.

12. The apparatus of claim 10 wherein said digital read out means includes number wheels, a stationary shaft, and means for rotatably mounting said number wheels on said stationary shaft, said number wheels being sequentially operated from wheel to wheel from the first to the last wheel with said first wheel being run off of said final counter shaft.

13. The apparatus of claim 10 further including means for gearing said final counter shaft to make one revolution about the second axis for each barrel of fluid passing through said metering element.

14. The apparatus of claim 10 wherein said measuring means includes a high resolution pulser, means to drive said pulser including a shaft, and means for driving said shaft off of said final counter shaft.

15. The apparatus of claim 14 wherein said driving means for said pulser further includes means for driving said shaft off of said final counter shaft about an axis at a right to said second axis in a one to one relationship to said final counter shaft.

16. The apparatus of claim 10 wherein said compensator is a temperature compensator.

17. Apparatus for proving and factoring a meter stack on a flow pipe, said stack comprising at least a meter with a metering element, compensator, and counter said apparatus further including:

means for positioning said metering element within said flow pipe for rotation about a first axis in response to fluid flow through said flow pipe, first drive means for operably coupling said compensator to said metering element through a first plurality of gears, said counter having in series a second plurality of gears, a final counter shaft mounted for rotation about a second axis, and a digital read out means run off of said final counter shaft, second drive means for operably coupling said counter shaft to said compensator through said second plurality of gears, means for pumping a known volume of fluid through said meter, said metering element rotating about said first axis in response thereto and operating said compensator through said first drive means including said first plurality of gears, said compensator in turn operating said second drive means including said second plurality of gears to cause said final counter shaft to rotate about said second axis, and said final counter shaft in turn operating said digital read out means, first drive means for measuring the amount of angular rotation of said final counter shaft about said second axis while said known volume of fluid flows through said meter, said first measuring means including a high resolution pulser, means to drive said pulser including a shaft, and means for driving said shaft off of said final counter shaft, said first measuring means being on an order of magnitude of at least 100 times smaller than the smallest incremental read out of the digital read out means wherein by comparing the measured amount of angular rotation of said final counter shaft against a predetermined amount representing a true reading of the known volume, the meter stack from the meter through the final counter shaft can be proven and an adjustment factor for the meter stack determined to compensate for any inaccuracies in the drive couplings from the meter through the final counter shaft, and second means for measuring the angular rotation of said final counter shaft including a low resolution pulser, means for driving said low resolution pulser including a shaft, a cam eccentrically mounted on said shaft, and a cam follower, and means for driving said shaft off of said final counter shaft.

18. The apparatus of claim 17 wherein the shaft driving the high resolution pulser and the shaft driving the low resolution pulser are the same shaft.

* * * * *